Figure 1:
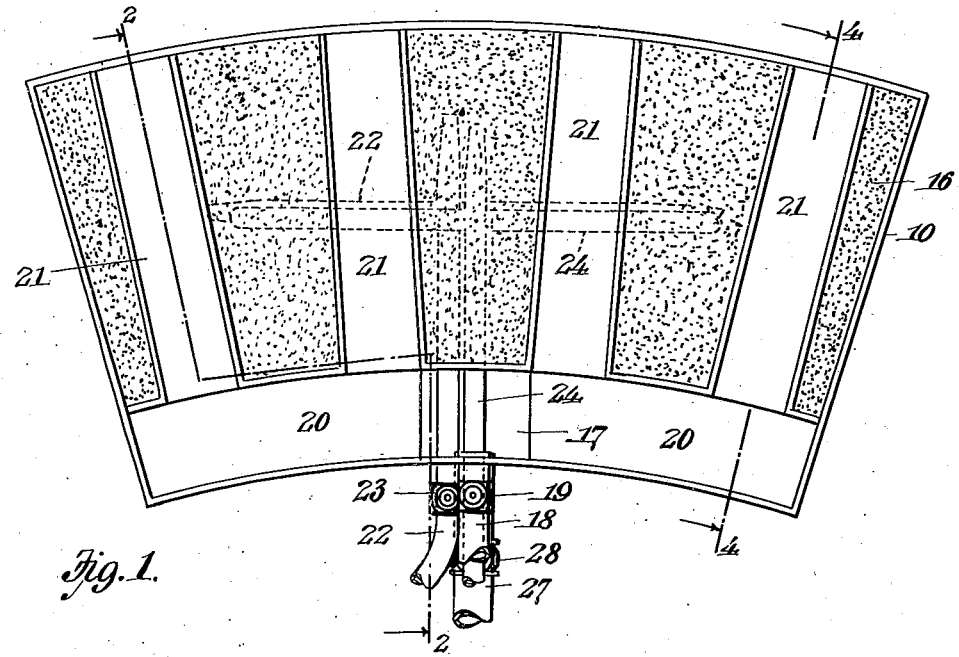

Dec. 9, 1941.    R. B. MORSE    2,265,741
LIQUID PURIFICATION APPARATUS
Original Filed April 11, 1934    2 Sheets-Sheet 1

Robert B. Morse, Deceased,
By Carrie E. Morse, Administratrix.

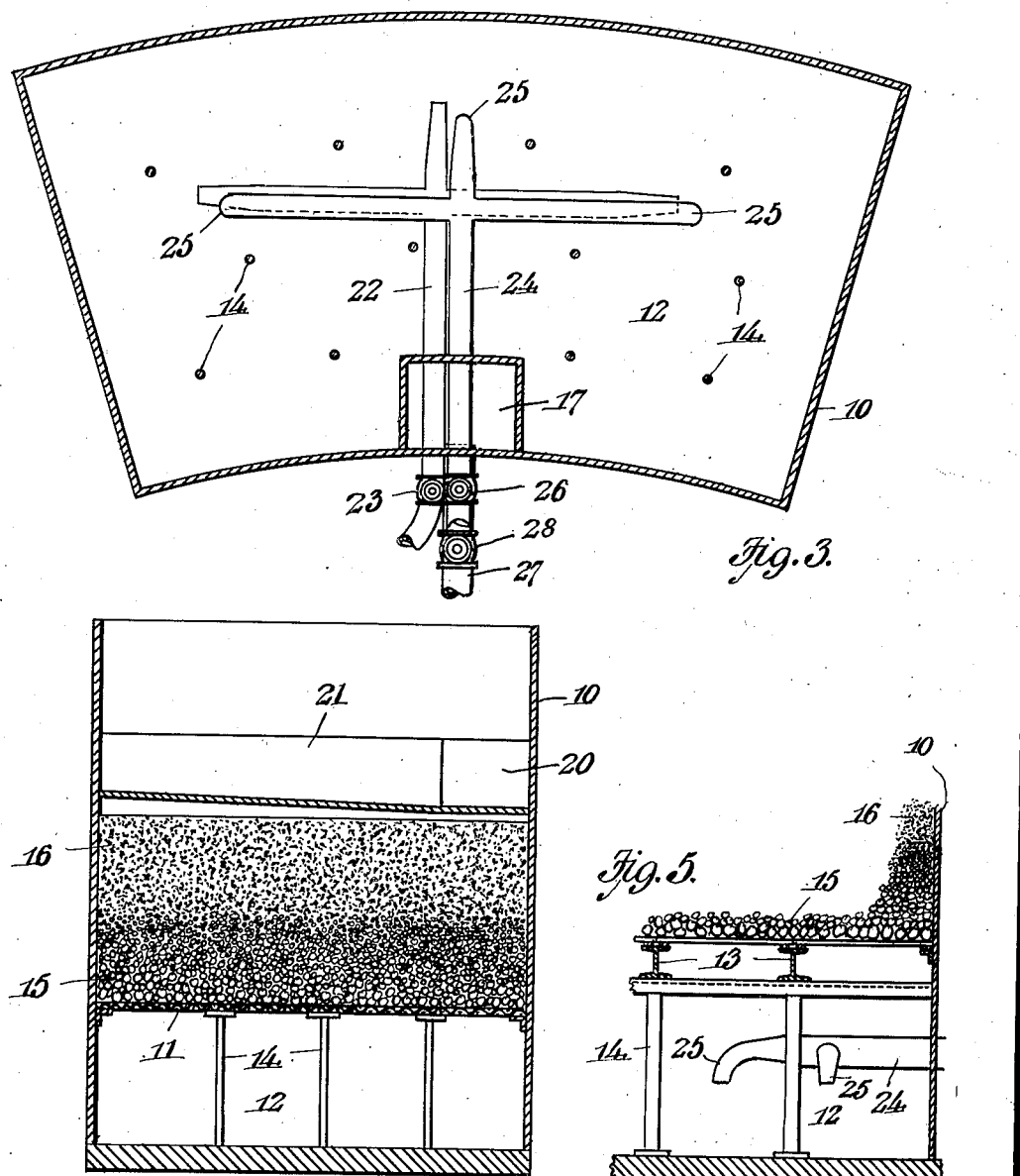

Patented Dec. 9, 1941

2,265,741

UNITED STATES PATENT OFFICE 2,265,741

LIQUID PURIFICATION APPARATUS

Robert B. Morse, deceased, late of Hyattsville, Md., by Carrie E. Morse, administratrix, Ruxton, Md.; said Carrie E. Morse assignor to Carrie E. Morse and Katherine B. M. Devereux, as joint tenants Continuation of application Serial No. 720,107, April 11, 1934. This application January 27, 1938, Serial No. 187,324

4 Claims. (Cl. 210—130)

This invention relates to liquid purification apparatus, and while it is directed primarily to means for treating raw water for drinking and domestic purposes, it will be understood that its use is not to be thus restricted, as with possible alterations or changes of minor nature it may be effectively used in the treatment of heavier polluted liquids, such as sewage, industrial waste, etc.

More particularly the invention relates to filter construction and operation, the filter herein disclosed being particularly adapted for use in connection with the liquid purification apparatus shown and described in United States Letters Patent of Robert B. Morse, deceased, No. 2,129,181, dated September 6, 1938, and of which the present application is a continuation.

A particular object of the apparatus here claimed is to provide a filter for effectively treating liquid passing therethrough which may be readily and quickly cleaned of impurities when required with the least possible opportunity for disturbance of the filter bed.

With these objects in view, together with others which will appear as the description proceeds, the invention consists in the novel construction, combination and arrangement of parts, all as will be described more fully hereinafter, illustrated in the drawings, and particularly pointed out in the claims.

Figure 2:
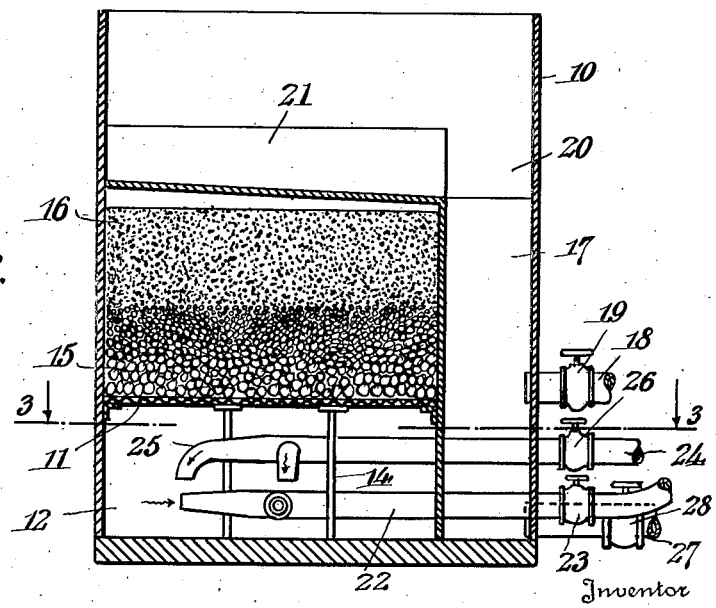

In the drawings:

Figure 1 is a top plan view of a filter constructed and arranged in accordance with the invention, Figure 2 is a vertical transverse sectional view taken upon line 2—2 of Figure 1, Figure 3 is a horizontal sectional view taken upon line 3—3 of Figure 2, Figure 4 is a view similar to Figure 2 but taken upon line 4—4 of Figure 1, and Figure 5 is a fragmentary vertical transverse sectional view through the filter and illustrating means whereby the filter bed may be supported.

In the Letters Patent aforesaid means are shown and described for treating raw water preliminary to its introduction to the filter, and while the filter herein disclosed is designed primarily for use in connection with a purification plant of the type disclosed in the said patent, it will be understood that its use is not to be necessarily restricted to that type of plant, as it may be efficiently used with other types of filtration plants, designed either with or without preliminary sedimentation or coagulation steps.

The filter chamber is included within the walls 10, wherein there is horizontally disposed a grating or screen 11 spaced a substantial distance above the floor of the chamber so as to provide a substantial space 12 between the said screen and the floor of the chamber. The screens as here disclosed cover substantially the entire horizontal area of the filter chamber, and in order to be readily removable are made in sections so shaped and fitted together as to provide a continuous floor for the filter material. These screens may be formed of spaced substantially parallel slats or bars as shown in Figure 5 secured together in any preferred or desired manner and supported upon I beams 13 supported by posts 14 rising from the floor of the filter chamber. Graded gravel 15 is arranged in proper depth upon the screen, and a bed of finer filter material 16, such as sand, is disposed upon this gravel bed. It will be understood that the graded gravel and sand will be arranged in proper depth so as to efficiently filter water passing downwardly therethrough to the space 12 beneath the screen.

A well or conduit 17 is arranged within the filter chamber, and into which the influent is introduced through a suitable pipe 18. This flow is controlled by a valve 19 of any suitable type or construction. The well, which extends upwardly from the floor of the compartment, is in communication at its upper end with a channel 20 extending preferably the length of the filter chamber. A plurality of relatively shallow troughs 21 communicate with the channel 20 and extend laterally in spaced relation over the filter bed. The construction is such that liquid entering the well 17 through pipe 18, rises therein and flows into the channel 20, from which it enters the several troughs 21 and spills over the edges thereof and onto the filter bed. The liquid precipitates through this bed, and in so passing is purified and freed of all solids, finally reaching the space 12 beneath the filter bed from whence it is conducted through pipe or duct 22 either to a pure water reservoir or to other chambers for further treatment if found necessary. The filter effluent is provided with several nozzles as shown in order that the filtered water may rapidly be removed from the pure water space beneath the filter bed and this flow may be discontinued when necessary by operation of valve 23. By providing the channel 20 and a plurality of troughs 21, it is apparent that a relatively large volume of water may be adequately taken care of in a comparatively limited amount of filter space and without danger of disturbance of the filter bed.

It frequently becomes necessary to clean the filter bed of solid matter and impurities collected therein during the filtration operation, and this is carried out effectively by discontinuing the filtering operation and reversing pure water through the filter bed. A pipe 24 leading from a suitable supply of filtered water, enters the space 12 beneath the filter bed a substantial distance above the floor of the filter chamber, and is provided with a plurality of nozzles 25 as shown. These nozzles are arranged relatively far apart so as to evenly dispose the flow over the floor of the chamber. These nozzles are turned in a downward direction as shown, so that the force of the water will be directed against the said floor. By this arrangement, a relatively large wash water pipe may be used, so as to insure rapid filling of the filter chamber and to thus quickly wash the bed without danger of disturbing the latter. The flow of wash water is controlled by valve 26.

When it is desired to reverse the flow of liquid through the filter for cleaning purposes, the valves 19 and 23 are closed, while valve 26 is opened. The wash water, through the several nozzles 25, quickly fills the space 12 and by the time the level thereof reaches the filter bed all turbulence or agitation is dissipated, so that the rise of wash water through the screen and the various layers of filter material will be steady and rapid with no possibility of the bed being disturbed. Such foreign matter as is held in the bed will be floated therefrom with the wash water and will flow over into the gutters or troughs 21 and through the channel 20 into well 17, from whence it flows through a wash water effluent 27 to a sewer. The flow through this effluent is governed by valve 28. In this manner, it will be found necessary to continue the flow of wash water only a comparatively short time, as the large volume and rapid flow through the filter will be found to effectively rid the latter of all foreign matter. After the filter bed has been thoroughly cleaned the valves 26 and 28 are closed, then valves 19 and 23 may be opened, thus continuing the filtering operation.

The filter chamber herein disclosed takes an arcuate shape, due to the fact that it is preferably associated with a circular liquid purification plant as disclosed in Letters Patent aforesaid, but it will be understood that it is not necessarily restricted to such shape or form but is susceptible of other shapes, sizes and dimensions without departing from the spirit of the invention.

Having thus described the invention, what is claimed is:

1. In a liquid purification apparatus, a filter chamber, an open work screen bottom spaced a substantial distance above the floor of said chamber, a graduated gravel filter bed arranged upon said bottom and having a sand covering, a well, a plurality of troughs overlying said bed, a channel communicating with said troughs and with said well, liquid nozzles disposed in downward direction in the space beneath said bottom, and means to admit liquid to said well.

2. In a liquid purification apparatus, a filter chamber, an open work bottom spaced a substantial distance above the floor of said chamber, a relatively deep gravel and sand filter bed arranged upon said bottom, a well, troughs overlying said bed, a channel communicating with said troughs and with said well, a plurality of liquid nozzles disposed near said floor and directed toward the latter, a drain for said chamber, means to admit liquid to said well, and a drain for said well.

3. In a liquid purification apparatus, a filter chamber of substantial area, a false bottom spaced above the floor of the chamber, said bottom comprising an open work screen constructed so as to permit substantially unobstructed flow of water uniformly throughout substantially its entire area, a filter bed of substantial depth arranged upon said bottom and comprising graduated gravel and a sand covering, means for admitting liquid to be filtered to the top of said bed, means for withdrawing filtered liquid from the space below said bed, means for delivering wash water to said space at high velocity and in large volume to back wash said bed, and means for draining off said wash water, said space being of sufficient depth and the initial outrush of wash water therein being in a direction other than toward said bottom and sufficiently spaced therefrom that the initial turbulence of the water is spent before it reaches said screen bottom, whereby a large volume of water may be forced back up through said open work bottom and said filter bed at a rate sufficiently rapid to lift and thoroughly clean the sand topping without disturbing the graduated gravel.

4. In a liquid purification apparatus, a filter chamber of substantial area, a false bottom spaced above the floor of the chamber, said bottom comprising an open work screen constructed so as to permit substantially unobstructed flow of water uniformly throughout substantially its entire area, a filter bed of substantial depth arranged upon said bottom and comprising graduated gravel and a sand covering, means for admitting liquid to be filtered to the top of said bed, means for withdrawing filtered liquid from the space below said bed, nozzles projecting into said space and directed downwardly therein away from said screen bottom for the delivery of wash water to said space at high velocity and in large volume, and means for draining off said wash water, said space being of such depth and the nozzles being so located with respect to said floor and said screen that the initial turbulence of the water issuing from said nozzles is spent before it reaches said screen bottom, whereby a large volume of water may be forced from said space back up through said open work bottom and said filter bed at a rate sufficiently rapid to lift and thoroughly clean the sand topping without disturbing the graduated gravel.

CARRIE E. MORSE,
*Administratrix of the Estate of Robert B. Morse, Deceased.*